(No Model.) 2 Sheets—Sheet 1.
J. CLARET & O. WUILLEUMIER.
ELECTRIC RAILWAY.
No. 537,672. Patented Apr. 16, 1895.
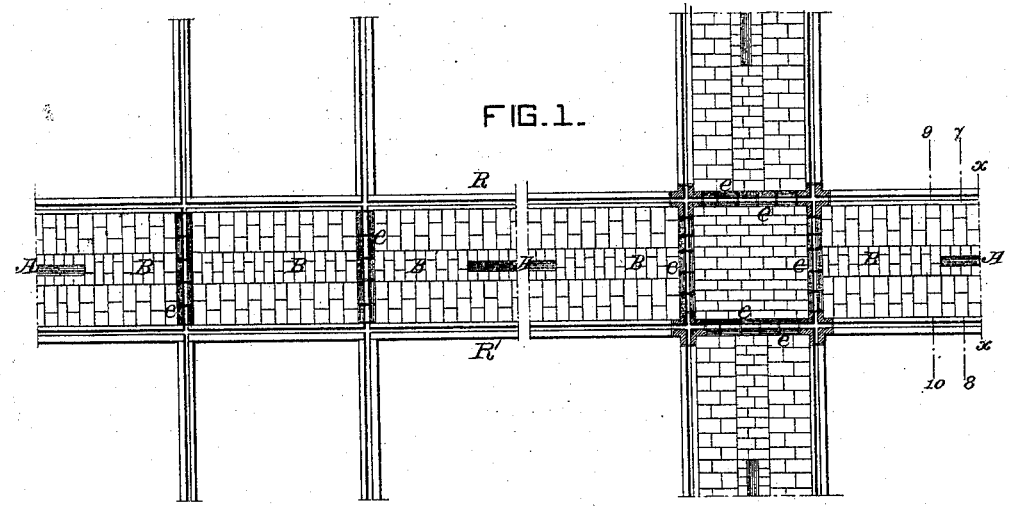
FIG.1.
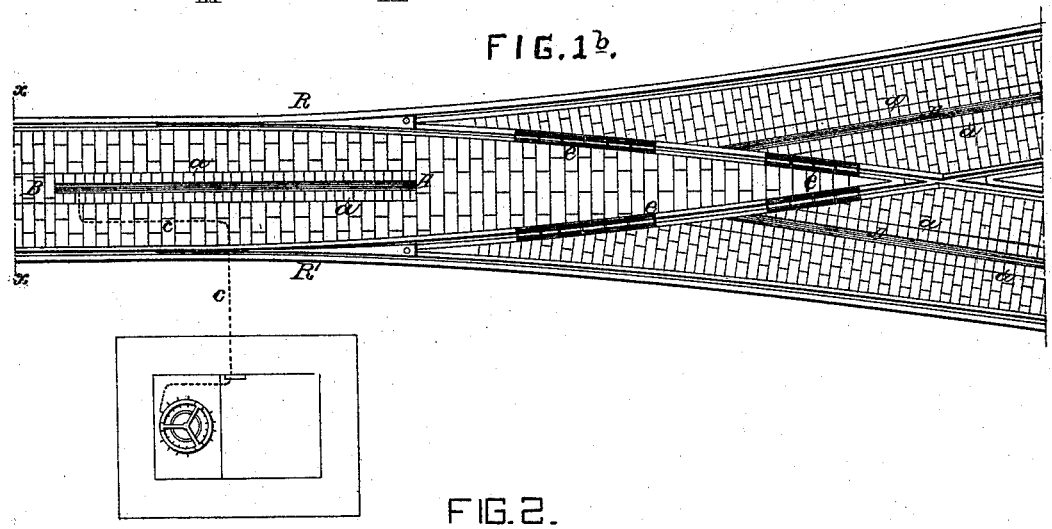
FIG.1ᵇ.
FIG.2.
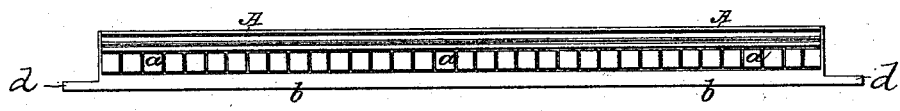
FIG.3.
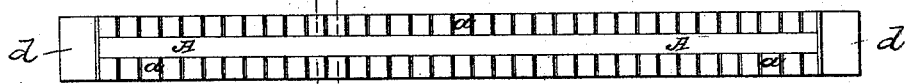
FIG.4. FIG.5.
WITNESSES:
George Baumann
Edith J. Griswold
INVENTORS
Jean Claret
Olivier Wuilleumier
BY
Howson and Howson
their ATTORNEYS.
THE NORRIS PETERS CO., PHOTO-LITHO., WASHINGTON, D. C.

(No Model.) 2 Sheets—Sheet 2.
J. CLARET & O. WUILLEUMIER.
ELECTRIC RAILWAY.
No. 537,672. Patented Apr. 16, 1895.
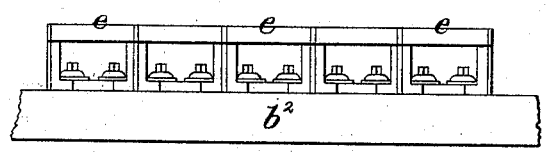
FIG. 6.
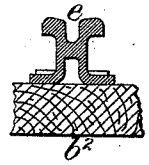
FIG. 8.
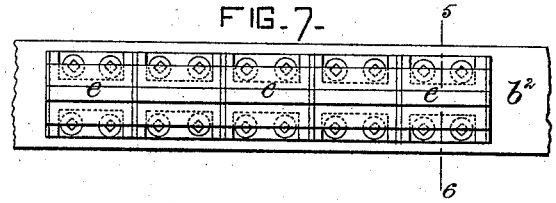
FIG. 7.
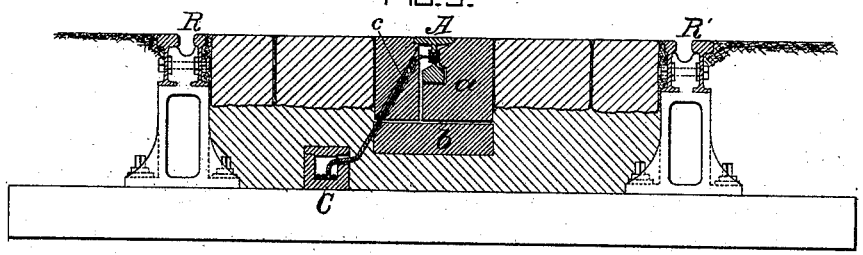
FIG. 9.
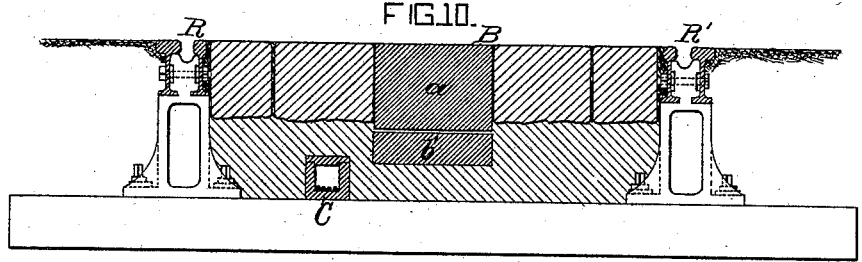
FIG. 10.
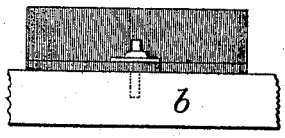
FIG. 11.　FIG. 12.
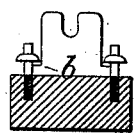
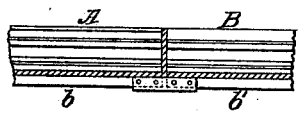
FIG. 2.
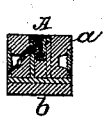
FIG. 3.
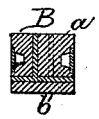
FIG. 4.
WITNESSES:
George Baumann
Edith J. Griswold
INVENTORS
Jean Claret
Olivier Wuilleumier
BY
Howson and Howson
their ATTORNEYS.
THE NORRIS PETERS CO., PHOTO-LITHO., WASHINGTON, D. C.

UNITED STATES PATENT OFFICE.

JEAN CLARET AND OLIVIER WUILLEUMIER, OF LYONS, FRANCE.

ELECTRIC RAILWAY.

SPECIFICATION forming part of Letters Patent No. 537,672, dated April 16, 1895.

Application filed September 19, 1894. Serial No. 523,439. (No model.) Patented in France March 17, 1894, No. 237,122.

*To all whom it may concern:*

Be it known that we, JEAN CLARET, undertaker, a citizen of the Republic of France, and OLIVIER WUILLEUMIER, engineer, a citizen of the Republic of Switzerland, residing in Lyons, Rhône, France, have invented a Permanent Way for Electric - Railway or Tramway Vehicles, (for which we have obtained a French patent, dated March 17, 1894, No. 237,122,) of which the following is a specification.

This invention relates to the construction of permanent ways for electric railway and tramway vehicles and is more particularly applicable to ways wherein the propelling by electricity is effected by means of automatic distributers which form the subject of our application for patent filed July 25, 1893, Serial No. 481,388, but it is applicable also to other constructions of electric railway in which sectional conductors or spaced contacts are used.

The method of construction according to this invention has for its main object to facilitate, and considerably reduce the cost of the construction of the permanent way while permitting various possible contingencies to be provided for, such as the crossing of, say, an electric railway line and a roadway, an ordinary railway line or any other road or path or of two electric lines, also junctions, switch boxes and the like.

To enable this invention to be better understood the following description refers to the accompanying drawings, in which—

Figures 1 and 1ᵇ together show a plan of sufficient of a line or way to illustrate the construction in accordance with this invention. In these figures it has been assumed that the way they represent is crossed by an ordinary road for horse traffic and by another electric railway line; and it has also been assumed that such crossing coincides with a signaling station at a junction. Figs. 2, 3, 4 and 5 are respectively, a longitudinal elevation, a plan, and cross sections on the lines 1—2 and 3—4 (Fig. 3) of one of the contacts situated in the middle of the line. Figs. 2ᵇ, 3ᵇ and 4ᵇ are respectively, a longitudinal elevation and two cross sections of a modification of these contacts. Figs. 6, 7 and 8 are, respectively, a longitudinal elevation, a plan, and a cross section on the line 5—6 Fig. 7, of one of the insulating lengths of rail adapted to be placed at the crossings and junctions. Figs. 9 and 10 represent on a larger scale cross sections on the lines 7—8 and 9—10 (Fig. 1) of the line or way in question and Figs. 11 and 12 are, respectively, a longitudinal elevation, and cross section, of a modification of the arrangement shown in Figs. 6, 7 and 8.

The method of traction, or propulsion, to which the mode of construction forming the subject of the present invention more particularly relates, comprises a line or way formed of rails for the vehicles to travel on, laid parallel to each other and properly gaged between which there are arranged contacts or current deliverers of suitable length and subterraneous conductors connected with the said contacts through the medium of automatic distributers and other apparatus. The invention relates to the construction of these contacts or current deliverers and also to the method of laying the rails at the point where they cross another line or road or where a switch or signal box or the like is situated.

According to this invention the center of the line is occupied by a central rail formed alternately (Fig. 1) of contacts or current deliverers A and intermediate insulating parts B. The contacts (Figs. 3, 4 and 5) are formed of a metal bar A (a length of rail for example) embedded in blocks *a* of wood or other suitable insulating material placed transversely, each in succession, and upon a beam *b* (Figs. 4 and 5) between the insulating blocks *a* and between these blocks and the beam *b* there is provided a space or recess a few millimeters in width, and when the whole arrangement has thus been connected, the joints are filled entirely with liquefied asphalt, sulphur, bitumen, or any other suitable insulating material. The ends are also fitted or covered with a coating of the same material. A cable *c* one end of which is fixed beforehand to the core of the rail A (Fig. 4) is also embedded in the molten material filling the joints. This cable is connected with electrical conductors placed either in a casing or sheath C (Fig. 9) or in a recess provided in the contacts A (Fig. 3ᵇ) and in the intermediate insulating portions B (Fig. 4ᵇ). When the molten material has cooled down and hardened, the result obtained will be a compact and rigid body which, when fixed in the ground, is capable of sustaining the heaviest strains or supporting the heaviest loads without being dislocated. In addition to this, the metal bar A is thoroughly insulated from the earth and does not require any chairs or supports to be maintained in the exact position required. The intermediate insulating parts B are formed in the same manner, with this difference only that the metal bars do not exist and that the insulating blocks $a$ (made of wood, for example) are so arranged as to form simple crossed joints with the beam $b'$ being rigidly united with each other and fixed to the said beam by means of a suitable insulating material, heated and liquefied or molten which, after cooling, forms a rigid and strong connection.

The beams $b$ of the contact A and the beam $b'$ of the intermediate portions B are connected end to end, at half thickness or half depth, by means of tongues $d$ provided at their ends, thus forming the central rail with independent contacts; but it will be understood that any other method of connection may be employed instead.

The ordinary rails R and R' of the line whereon the vehicles are to travel may be of any convenient construction, and fitted in chairs secured to sleepers embedded in the soil. This part of the construction, therefore, offers no peculiarity; but such is not the case where crossings, junctions or signaling stations occur (see Fig. 1) and where perfect insulation is necessary.

To provide for satisfactory insulation and facilitate the laying of the rail, the insulating portions to be arranged at the points mentioned are constructed in a manner somewhat similar to that described with reference to the contacts A. These insulating portions consist of lengths of rails $e$ (Figs. 6, 7 and 8) made comparatively short and arranged in such a manner as to leave a little space between them. Into this space is poured a solution of india rubber. When this is done, the whole arrangement is placed in a vulcanizing chamber or oven where the india rubber solution is hardened and the sections or lengths of rails joined, the result being a rigid piece which is laid without difficulty and at a single operation, at crossings such as shown in Fig. 1.

In the case of switch or signal stations, insulating pieces constructed in the same manner as above described are interposed at points such as shown in Fig. 1. These insulating parts are, in all cases, bolted each upon a beam $b^2$ which connects them with the ordinary rails of the line. As a modification, these insulating parts, instead of being formed of lengths of rail, may consist of simple sheets of steel cut so as to accommodate the sectional shape of the rail (Figs. 11 and 12) and arranged side by side, with spaces between, which are filled with a solution of india rubber, which is subsequently vulcanized as stated above.

We claim—

1. An electric railway having the sectional or spaced contacts, each consisting of a metal bar embedded in insulating blocks arranged transversely and resting upon a beam, such blocks being connected by an insulating substance molten and poured while hot into the joints and forming after cooling a compact and rigid body.

2. In an electric railway having sectional conductors with the intermediate insulating parts of insulating blocks arranged transversely upon a beam, such blocks being connected by an insulating substance molten and poured while hot into the joints, and forming when cooled a compact and rigid body connected with the contacts for the purpose of forming the central rail of the line.

3. An electric railway system having the permanent way rails provided at crossings and junctions with insulating pieces composed of a series of lengths of rail insulated from each other by any suitable insulating material and connected in such a manner as to form an insulating and rigid section of the line rails, substantially as described.

4. An electric railway having the permanent way rails provided at crossings and junctions with insulating parts composed of lengths of rails connected or soldered together by an insulating substance poured in between them and vulcanized, to constitute a compact and rigid body which is interposed in the line of rails joined end to end.

In testimony whereof we have signed our names to this specification in the presence of two subscribing witnesses.

JEAN CLARET.
OLIVIER WUILLEUMIER.

Witnesses:
THOS. N. BROWNE,
M. VOCHON.